United States Patent
Shan et al.

(10) Patent No.: US 10,732,800 B2
(45) Date of Patent: *Aug. 4, 2020

(54) METHOD AND SYSTEM FOR COLLECTING CONTENT

(71) Applicant: Tencent Technology (Shenzhen) Company Limited, Shenzhen (CN)

(72) Inventors: Yi Shan, Shenzhen (CN); Jun Wang, Shenzhen (CN); Wei Luo, Shenzhen (CN); Ling Li, Shenzhen (CN); Likai Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/420,024

(22) Filed: May 22, 2019

(65) Prior Publication Data

US 2019/0272070 A1 Sep. 5, 2019

Related U.S. Application Data

(63) Continuation of application No. 15/187,554, filed on Jun. 20, 2016, now Pat. No. 10,338,777, which is a
(Continued)

(30) Foreign Application Priority Data

Jan. 24, 2014 (CN) .......................... 2014 1 0035870

(51) Int. Cl.
*G06F 3/0482* (2013.01)
*H04L 12/58* (2006.01)
(Continued)

(52) U.S. Cl.
CPC ........ *G06F 3/0482* (2013.01); *G06F 3/04817* (2013.01); *G06F 3/04842* (2013.01); *H04L 51/32* (2013.01); *H04L 51/10* (2013.01)

(58) Field of Classification Search
CPC ................ G06F 3/048; H04N 1/00196; H04N 1/0044–00461; G06Q 50/01; H04L 51/32; H04L 51/10
See application file for complete search history.

(56) References Cited

U.S. PATENT DOCUMENTS 9,152,312 B1 * 10/2015 Terleski ................. G06F 3/0488
9,595,015 B2 * 3/2017 Bucchieri ............. G06Q 50/01
(Continued)

FOREIGN PATENT DOCUMENTS

CN 1912869 A 2/2007
CN 101079872 A 11/2007
(Continued)

OTHER PUBLICATIONS

Tencent Technology, ISRWO, PCT/CN2015/070687, Apr. 16, 2015, 7 pgs.
(Continued)

*Primary Examiner* — Liang Y Li
(74) *Attorney, Agent, or Firm* — Morgan, Lewis & Bockius LLP

(57) ABSTRACT

Method and device of storing content objects within a social network application are disclosed. The method includes: a user device providing a user interface of the social network application on the user device, the user interface including an affordance for forming a content group including respective content objects of one or more object types; receiving a selection of a first plurality of images for inclusion in the first content group; providing a listing of context objects that are associated with at least one of the first plurality of
(Continued)

images; receiving a user input indicating completion of the first content group; and forming the first content group containing the first plurality of images and the one or more content object selected from the listing of context objects information.

20 Claims, 12 Drawing Sheets

Related U.S. Application Data continuation of application No. PCT/CN2015/070687, filed on Jan. 14, 2015.

(51) Int. Cl.
*G06F 3/0481* (2013.01)
*G06F 3/0484* (2013.01)

(56) References Cited

U.S. PATENT DOCUMENTS

| | | | |
|---|---|---|---|
| 2008/0201446 A1 | 8/2008 | Svendsen | |
| 2012/0072428 A1* | 3/2012 | Kao | G06Q 10/00 707/748 |
| 2012/0117473 A1 | 5/2012 | Han et al. | |
| 2013/0036171 A1* | 2/2013 | Gilbert | G06Q 50/01 709/204 |
| 2013/0238964 A1 | 9/2013 | Perrodin et al. | |
| 2013/0262261 A1* | 10/2013 | Rozek | G06Q 30/0621 705/26.5 |
| 2013/0290929 A1 | 10/2013 | Lee et al. | |
| 2017/0032186 A1* | 2/2017 | Murata | G06F 3/002 |
| 2017/0131855 A1 | 5/2017 | Svendsen et al. | |

FOREIGN PATENT DOCUMENTS

| | | |
|---|---|---|
| CN | 101217640 A | 7/2008 |
| CN | 101957818 A | 1/2011 |
| CN | 102122286 A | 7/2011 |
| CN | 102611644 A | 7/2012 |
| CN | 102663064 A | 9/2012 |
| CN | 102722481 A | 10/2012 |
| CN | 102750352 A | 10/2012 |

OTHER PUBLICATIONS

Tencent Technology, IPRP, PCT/CN2015/070687, Jul. 26, 2016, 5 pgs.

* cited by examiner

Server System 508

METHOD AND SYSTEM FOR COLLECTING CONTENT

PRIORITY CLAIM AND RELATED APPLICATION

This application is a continuation application of U.S. patent application Ser. No. 15/187,554, entitled "METHOD AND SYSTEM FOR COLLECTING CONTENT" filed on Jun. 20, 2016, which is a continuation application of PCT Patent Application No. PCT/CN2015/070687, entitled "METHOD AND SYSTEM FOR COLLECTING CONTENT" filed on Jan. 14, 2015, which claims priority to Chinese Patent Application No. 201410035870.2, entitled "Method, Apparatus and Terminal for Collecting Content" filed on Jan. 24, 2014, all of which are incorporated by reference in their entirety.

TECHNICAL FIELD

The disclosed implementations relate generally to the field of internet communications, and in particular, to a method, apparatus and terminal for collecting content objects.

BACKGROUND

Users of social network applications increasingly use these applications not just to chat, but also to share lots of images, photos, music and videos. Users share their episodes of lives, hobbies, feelings, thoughts, gossips, experiences, by using increasingly rich multi-media methods. While current social network applications often provide functions of document sharing, the focus of the sharing is on each single document. Users have to manually collect each document related to one theme and share them one by one. For users, these documents are stored and shared out of context. This traditional document-oriented approach is based on how computer handles documents. Yet this approach often frustrates social interactions, which are typically theme oriented or topic oriented. Therefore, it is desirable to have a method that enables users to store and share documents based on the topics and themes.

SUMMARY

In accordance with some implementations of the disclosed technology, a method of storing content objects within a social network application is disclosed. The method comprises: a user device (e.g., client device 504, FIGS. 5, 7 and 8) providing a user interface of the social network application on the user device, the user interface including an affordance for forming a content group including respective content objects of one or more object types; after receiving user selection of the affordance to create a first content group, receiving a selection of a first plurality of images for inclusion in the first content group; after receiving the selection of the first plurality of images, providing a listing of context objects that are associated with at least one of the first plurality of images, wherein the listing of context objects includes one or more content objects of at least one non-image object type; receiving a selection of one or more content objects from the listing of context objects that are associated with at least one of the first plurality of images; after receiving the selection of the one or more content objects from the listing of context objects, receiving a user input indicating completion of the first content group; and in response to receiving the user input indicating completion of the first content group, forming the first content group containing the first plurality of images and the one or more content object selected from the listing of context objects information.

In some embodiments, a user device (e.g., client device 504, FIGS. 5, 7 and 8), includes one or more processors, and memory storing one or more programs for execution by the one or more processors, the one or more programs include instructions for performing the operations of any of the methods described herein.

In some embodiments, a non-transitory computer readable storage medium storing one or more programs, the one or more programs comprising instructions, which, when executed by a user device (e.g., client device 504, FIGS. 5, 7 and 8), cause the user device to perform the operations of any of the methods described herein. In some embodiments, a user device (e.g., client device 504, FIGS. 5, 7 and 8) includes means for performing, or controlling performance of, the operations of any of the methods described herein.

BRIEF DESCRIPTION OF DRAWINGS

The aforementioned implementation of the technology as well as additional implementations will be more clearly understood as a result of the following detailed description of the various aspects of the technology when taken in conjunction with the drawings. Like reference numerals refer to corresponding parts throughout the several views of the drawings.

DETAILED DESCRIPTION

To make the objective, technical solution and advantages of the present application more clear, the present application is further described in details with reference to the embodiments hereinafter.

Figure 1:
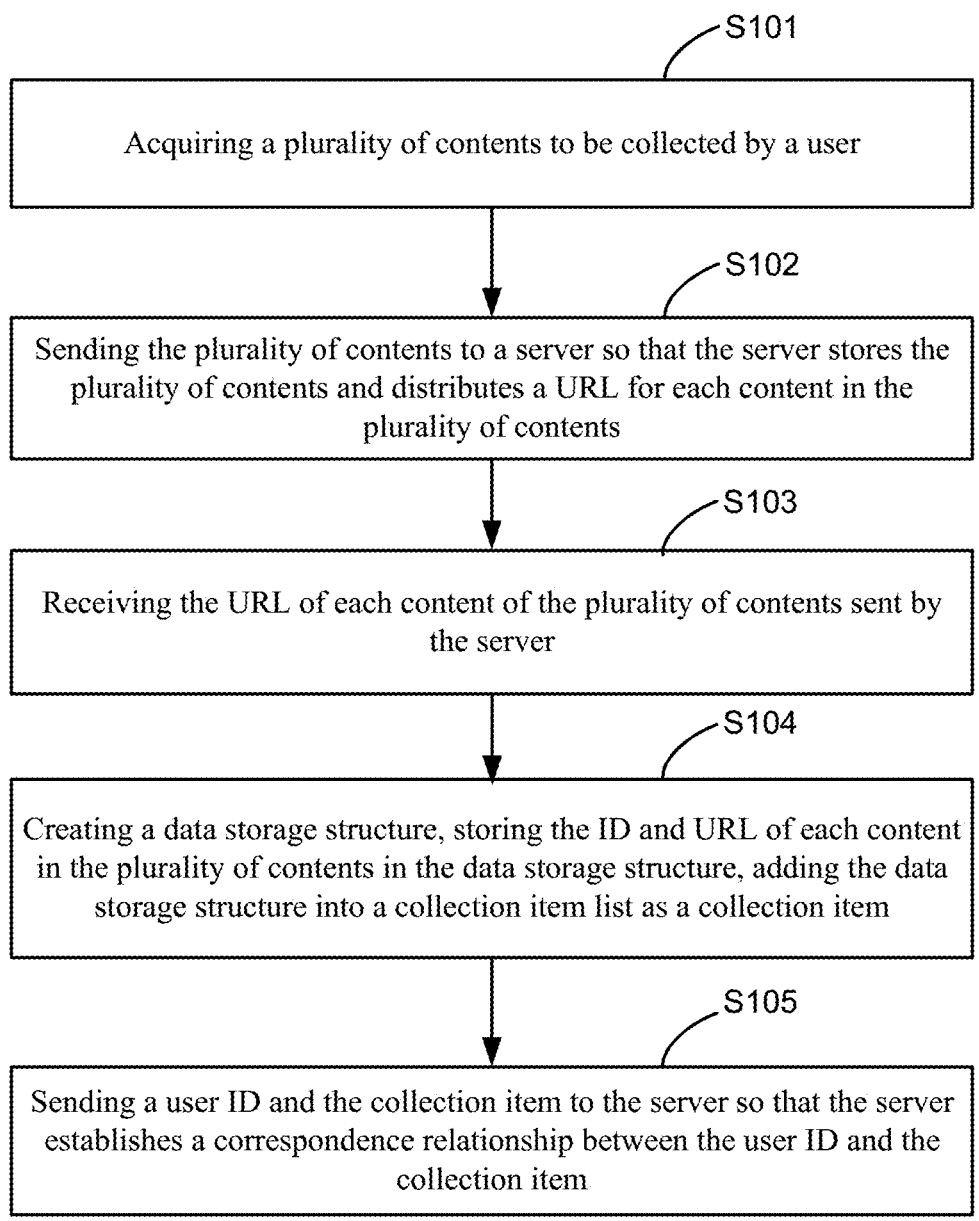
FIG. 1 is a flowchart of a method for collecting contents in accordance with some embodiments.

FIG. 1 is a flowchart of a method for collecting contents in accordance with some embodiments.

Step 101: Acquiring a plurality of content objects to be collected by a user.

Step 102: Sending the plurality of content objects to a server so that the server stores the plurality of content objects and distributes a URL (Uniform Resource Locator) for each content object in the plurality of content objects.

Step 103: Receiving the URL of each content object of the plurality of content objects sent by the server.

Step 104: Creating a data storage structure, storing the ID and URL of each content object in the plurality of content objects in the data storage structure, adding the data storage structure into a collection item list as a collection item.

Step 105: Sending a user ID and the collection item to the server so that the server establishes a corresponding relationship between the user ID and the collection item.

Figure 2:
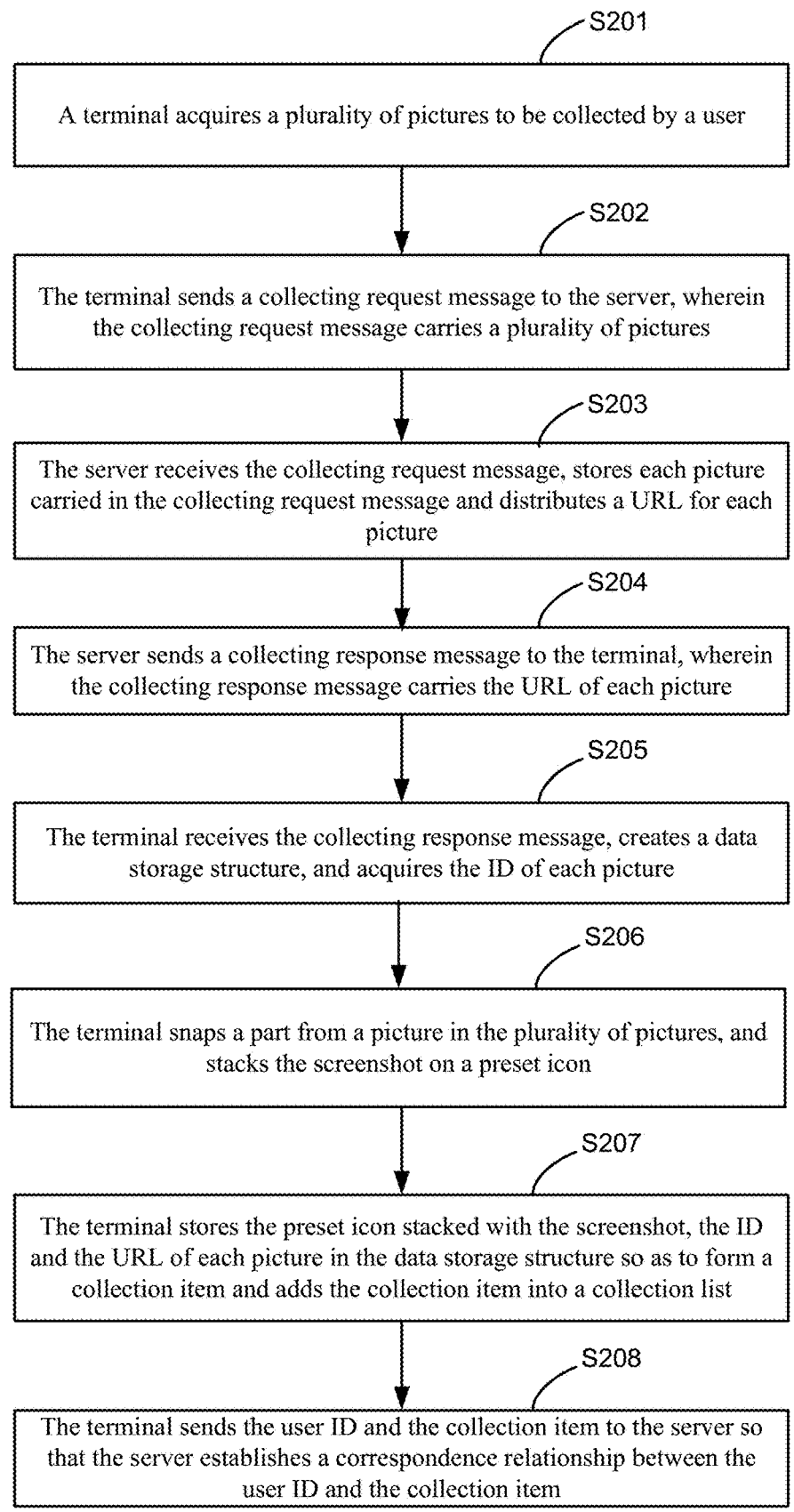
FIG. 2 is a flowchart of a method for collecting contents in accordance with some embodiments.

In accordance with some embodiments, content objects comprise pictures, text, voice messages, music documents, videos, network remarks, diaries, etc. Collecting pictures is taken as an example to illustrate other same processes of collecting other content objects. The collecting processes of such contents as text and voices are the same as the collecting process of pictures and will not be illustrated one by one. As shown in FIG. 2, the collecting process comprises:

Step 201: A terminal acquires a plurality of pictures to be collected by a user.

The user may select a plurality of pictures from a local photo album of the terminal or take a plurality of pictures through the build-in photographing function of the terminal, and summit the pictures to the terminal. The terminal receives the plurality of pictures submitted by the user and takes the plurality of pictures as the plurality of pictures to be collected by the user.

Figure 4A:
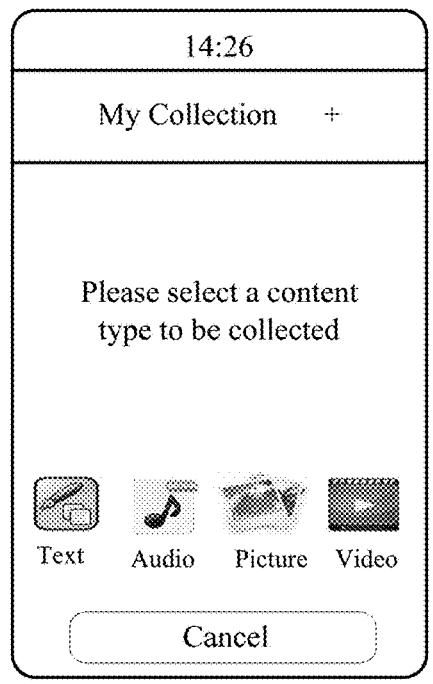
FIGS. 4A-4C are schematic diagrams of a content collecting interface in accordance with some embodiments.
Figure 4B:
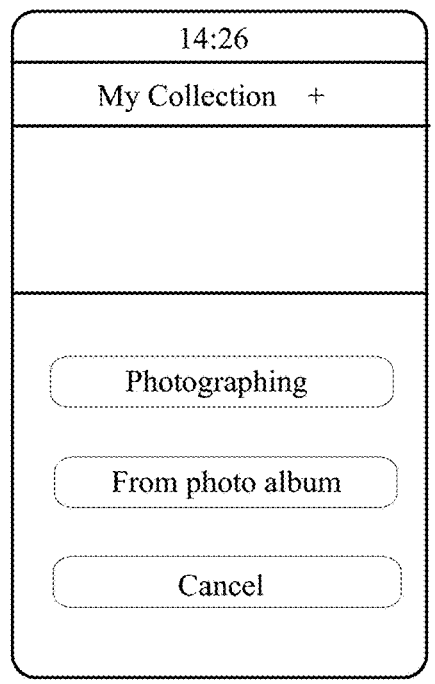
Figure 4C:
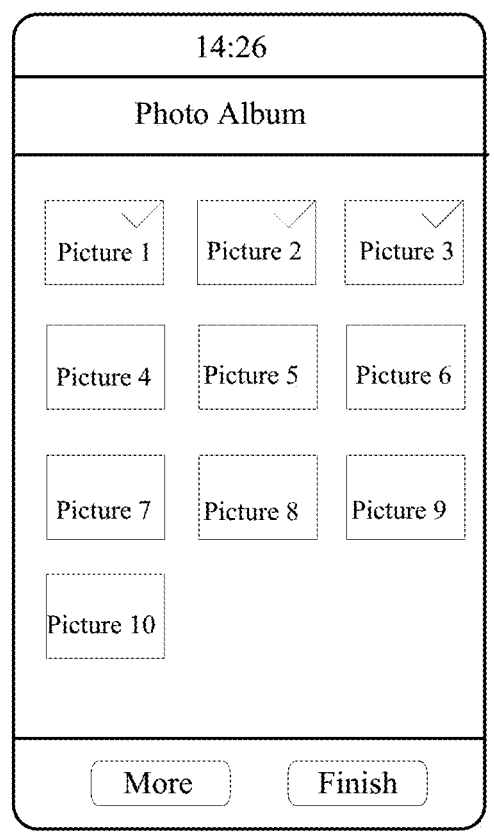

Taking a plurality of pictures to be collected for example. As illustrated in FIG. 4A, the terminal displays a collecting interface. At the upper right corner of a content collecting interface, there is a button "+" used for submitting a collecting command, and the user may submit a collecting command to the terminal by clicking the button "+". The terminal, after receiving the collecting command, displays a type interface. The type interface comprises a plurality of content types, which include pictures, text, voices and so on. The user may select a content type for collection in the type interface and submit the content type to the terminal. Suppose the user selects "picture", as illustrated in FIG. 4B. The terminal displays a picture acquisition manner. The picture acquisition manner may be "photographing" and "acquiring from the photo album." Suppose the user selects "acquiring from the photo album." The terminal opens a photo album which is locally saved, as illustrated in FIG. 4C. The user may select a plurality of pictures to be collected which are respectively pictures 1, 2 and 3 in the photo album, and submit the pictures to the terminal. The terminal acquires the pictures 1, 2 and 3 to be collected which are selected by the user.

Step 202: The terminal sends a collecting request message to the server, wherein the collecting request message carries a plurality of pictures.

For example, the terminal sends the collecting request message to the server, wherein the collecting request message carries the pictures 1, 2 and 3.

Step 203: The server receives the collecting request message, stores each picture carried in the collecting request message and distributes a URL for each picture.

Step 204: The server sends a collecting response message to the terminal, wherein the collecting response message carries the URL of each picture.

For example, the server receives the collecting request message which carries the pictures 1, 2 and 3, stores the pictures 1, 2 and 3, and distributes URLs which are URL 1, URL 2 and URL 3 for the pictures 1, 2 and 3 respectively, and sends the collecting response message to the terminal, wherein the collecting response message carries the URLs of the pictures 1, 2 and 3.

Step 205: The terminal receives the collecting response message, creates a data storage structure, and acquires the ID of each picture.

Specifically, the terminal receives the collecting response message, creates a data storage structure which may be an xml (Extensible Markup Language) data structure, acquires a storage path of each picture for local storage, and respectively generates the ID of each picture according to the storage path of each picture.

A Hash operation may be carried out on the storage path of each picture to obtain a Hash value of each picture, and the Hash value of each picture is respectively taken as the ID of each picture.

For example, for the pictures 1, 2 and 3, the terminal acquires the storage path of picture 1 for local storage as path 1, acquires the storage path of picture 2 for local storage as path 2, acquires the storage path of picture 3 for local storage as path 3, respectively carries out Hash operation on the path 1, path 2 and path 3 to obtain ID 1 of picture 1, ID 2 of picture 2 and ID 3 of picture 3.

Step 206: The terminal snaps a part from a picture in the plurality of pictures, and stacks the part on a preset icon, wherein the size of the part is equal to the area of the preset icon, and the preset icon has a picture overlaying display effect.

Specifically, the terminal selects a picture from the plurality of pictures, acquires the area of the preset icon which has the picture overlaying display effect, snaps a part from the selected picture according to the acquired area, and stacks the part on the preset icon.

Figure 4D:
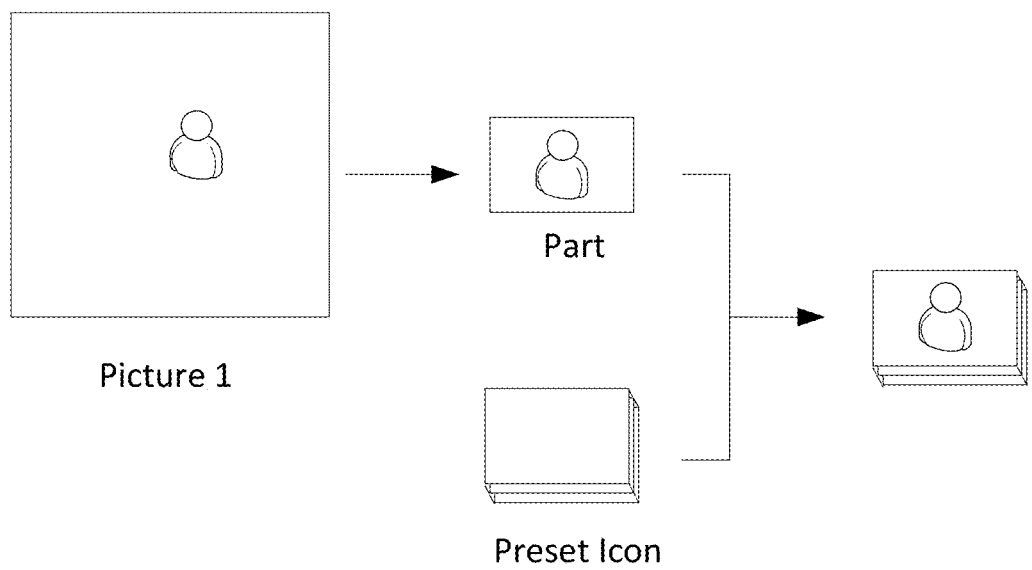
FIG. 4D is a schematic diagram of a picture stacking process in accordance with some embodiments.

For example, the terminal selects a picture from the pictures 1, 2 and 3. Supposing picture 1 is selected, the terminal acquires the area of the preset icon which has the picture overlaying display effect as illustrated in FIG. 4D, snaps a part from the selected picture 1 according to the acquired area, and stacks the part on the preset icon.

Step 207: The terminal stores the preset icon stacked with the part, the ID and the URL of each picture in the data storage structure so as to form a collection item and adds the collection item into a collection list. In some embodiments, a collection item is a content group.

In the data storage structure, the terminal displays the preset icon stacked with the part, and hides the ID and URL of each picture.

Figure 4E:
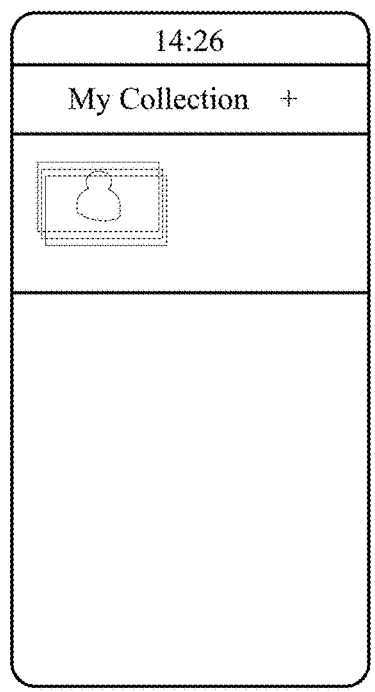
FIGS. 4E-4J are schematic diagrams of a content collecting interface in accordance with some embodiments.

For example, a content collecting interface displayed by the terminal comprises the collection list. The terminal stores the preset icon stacked with part of picture 1 as illustrated in FIG. 4D, the ID 1 and the URL 1 of picture 1, the ID 2 and the URL 2 of picture 2, and the ID 3 and the URL 3 of picture 3 in the data storage structure, displays the preset icon stacked with the part and hides the IDs and the URLs of pictures 1, 2, 3, takes the data storage structure as a collection item 1 and adds the data storage structure into the collection list, as illustrated in FIG. 4E.

Step 208: The terminal sends the user ID and the collection item to the server so that the server establishes a corresponding relationship between the user ID and the collection item.

Specifically, the terminal sends the user ID and the collection item to the server. The server receives the user ID and the collection item, stores the user ID and the collection item in the corresponding relationship between the user ID and the collection item.

For example, the terminal sends the user ID UesID and the collection item 1 to the server. The server stores the user ID UesID and the collection item 1 with corresponding relationships among the user ID and the collection item as shown in Table 1.

TABLE 1

| User ID | Collection item |
| --- | --- |
| UesID | Collection item 1 |
| ... | ... |

The user, after collecting the pictures, may select one collection item to be viewed in the collection lists of a content collecting interface, and then the terminal displays the collection item according to the following steps.

11: The terminal acquires the collection item to be viewed from the collection list, creates and displays the picture details page. In some embodiments, the picture details page comprises the thumbnail of each picture in the collection item to be viewed.

Specifically, the terminal acquires the collection item to be viewed, and acquires each picture from the terminal locally according to the ID of each picture included in the collection item to be viewed; shrinks each picture to obtain a thumbnail for each picture, wherein the size of the thumbnail of each picture is within a preset range of size. Then the terminal creates a blank page, and adds the thumbnail of each picture into the page to obtain the picture details page.

The terminal, after acquiring each picture, also acquires the length and width of each picture, stores the ID, length and width of each picture with corresponding relationships among the ID, length and width of the picture.

Figure 4F:
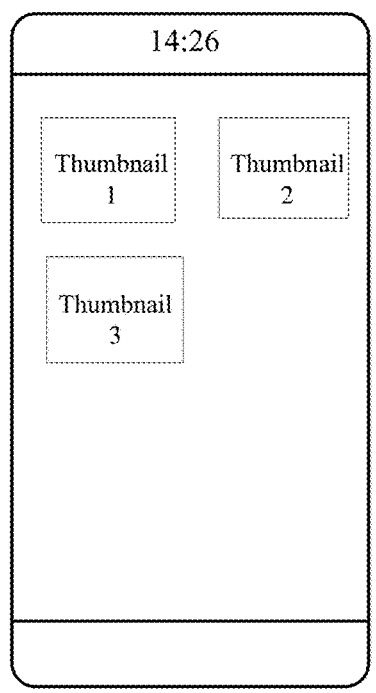

For example, the user selects the collection item to be viewed from the collection list as illustrated in FIG. 4E. Supposing the collection item to be viewed is the first collection item included in the collection list as illustrated in FIG. 4E, the terminal, according to IDs of pictures 1, 2 and 3 included in the collection item to be viewed, acquires picture 1, picture 2 and picture 3 from the terminal locally, acquires the length of picture 1 as L1 and the width of picture 1 as S1, the length of picture 2 as L2 and the width of picture 2 as S2 as well as the length of picture 3 as L3 and the width of picture 3 as S3, and then stores the ID, length and width of each picture in the corresponding relationship among the ID, length and width of the icon as shown in Table 2. The terminal respectively shrinks picture 1, picture 2 and picture 3 to obtain a thumbnail 1 of picture 1, the thumbnail 2 of picture 2 and the thumbnail 3 of picture 3. The terminal creates a blank page, adds the thumbnail 1 of picture 1, the thumbnail 2 of picture 2 and the thumbnail 3 of picture 3 into the page to obtain the picture details page as illustrated in FIG. 4F.

TABLE 2

| ID of picture | Length | Width |
| --- | --- | --- |
| ID 1 | L1 | W1 |
| ID 2 | L2 | W2 |
| ID 3 | L3 | W3 |
| ... | ... | ... |

After the terminal displays the picture details page, the user may select the thumbnail of the picture to be viewed in the picture details page.

12: The terminal acquires the thumbnail of one picture selected by the user, amplifies the thumbnail of the picture so as to restore the original size of the picture, and displays the amplified picture.

Specifically, the terminal acquires the thumbnail of one picture selected by the user, acquires the length and width of the picture from the corresponding relationship among the ID, length and width of the picture according to the ID of the picture, and amplifies the thumbnail of the picture so as to restore the original size of the picture according to the length and width of the picture, and displays the amplified picture.

For example, suppose the user selects the thumbnail 1 of picture 1. The terminal acquires the length L1 and width W1 of picture 1 from the corresponding relationship among the ID, length and width of the picture as shown in Table 2, amplifies the thumbnail 1 of picture 1 according to the length L1 and width W1 of picture 1 so as to restore the original size of picture 1, and displays the amplified picture 1.

If the user needs to view the picture on another terminal (first terminal), the user inputs the user ID to the first terminal, which sends the user ID to the server. The server receives the user ID, acquires the corresponding collection item according to the user ID, and sends the acquired collection item to the first terminal.

The first terminal receives the collection item sent by the server, adds each received collection item into the collection list, acquires the URL and ID of each picture from the received collection item, downloads each picture according to the URL of each picture, acquires the storage path of each picture according to the ID of each picture, and stores each picture according to the storage path of each picture, wherein inverse operation of a Hash operation may be carried out on the ID of each picture to obtain the storage path of each picture.

Then, the user may select the collection item to be viewed in the collection list according to the viewing processes described in 11 and 12.

Figure 3:
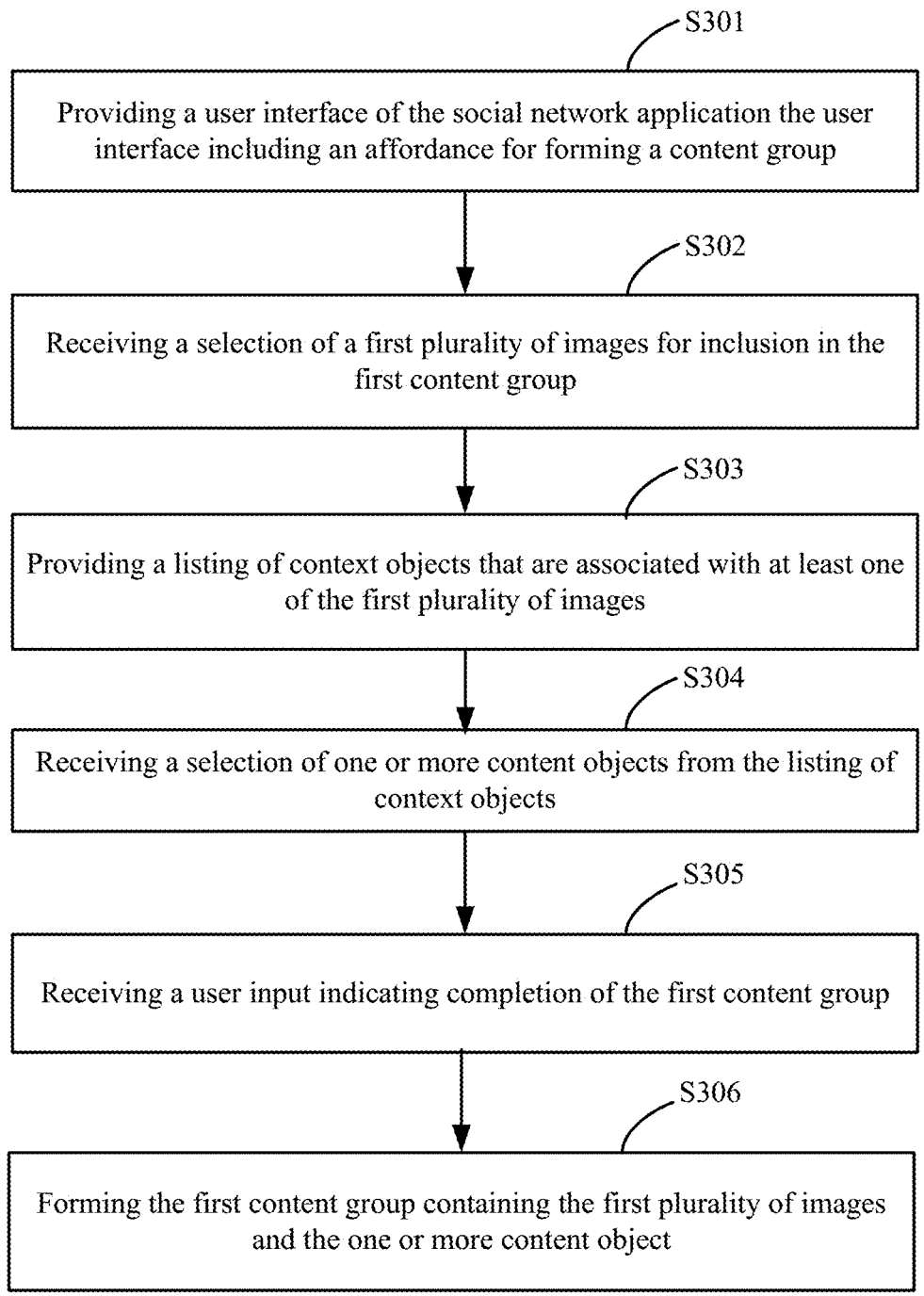
FIG. 3 is a flowchart of a method of storing content objects within a social network application in accordance with some embodiments.

FIG. 3 is a flowchart of a method of storing content objects within a social network application in accordance with some embodiments. In some embodiments, the method is performed at a user device (e.g., client device 504, FIGS. 5, 7 and 8) of having one or more processors and memory for storing one or more programs to be executed by the one or more processors.

In accordance with some embodiments, in a step S301, the user device provides a user interface of the social network application on the user device, the user interface including an affordance for forming a content group including respective content objects of one or more object types.

For example, the user interface may show a button for a user to touch, e.g., the "+" as illustrated in FIG. 4A. Once the button is touched, the user device enters a process of forming a content group.

In accordance with some embodiments, in a step S302, after receiving user selection of the affordance to create a first content group, the user device receives a selection of a first plurality of images for inclusion in the first content group.

The process of selecting pictures from various sources has been illustrated in FIGS. 4A-4C and accompanying text. In short, the user can select photos and images from various sources, including camera, local storage, social network, emails, online articles, and so on.

In accordance with some embodiments, in response to receiving user selection of the affordance, the user device presents a listing of object types for user selection, as illustrated in FIG. 4A. The user device receives user selection of a first object type from the listing of object types, the first object type being images. In some embodiments, in response to receiving the user selection of images, the user device provides a listing of images for user selection. In some embodiments, the selection of the first plurality of images is received in response to the provision of the listing of images.

In accordance with some embodiments, in a step S303, after receiving the selection of the first plurality of images, the user device provides a listing of context objects that are associated with at least one of the first plurality of images, wherein the listing of context objects includes one or more content objects of at least one non-image object type.

In some embodiments, these content objects are independent objects that are related to the images. For example, if the selected images are taken by the user at the ocean park on Jul. 9, 2014, the context information would include location objects (e.g., including address, map, guide) for the ocean park or similar theme parks, contact objects (e.g., contact cards of people who were there with me, or who visited there before or after me, or who has showed an interest in visiting the ocean park), message objects (e.g., chat messages discussing how the visit was, and the plan to visit the ocean park), post objects (e.g., posts related to visits to ocean park, news article related to the visit, etc.).

In addition to image, text, audio, video, a user can also select other object types, including context object, existing group, and the current object. In some embodiments, in response to a determination that no input indicating completion of the first content group has been received after receiving the selection of the first plurality of image, the user device may provide these types of context object, existing group, and the current object. For example, a user may touch the "more" button at bottom left of the interface to indicate group formation has not completed, as illustrated in FIG. 4C.

In accordance with some embodiments, the "context objects" object types only show up in the listing after the user has added at least one object (e.g. an image) in the current object. In accordance with some embodiments, in response to a determination that no input indicating completion of the first content group has been received after receiving the selection of the first plurality of image, the user device adds a first additional object type for context objects in the listing of object types, and re-presents the listing of object types for user selection. For example, after a user makes a few selections going through interfaces illustrated in FIGS. 4A-4C, the user device re-presents an interface illustrated in FIG. 4G to the user. After selecting a context object button, the user can select whether the user device should automatically generate context objects or the user wants to browse and select context objects by himself. In some embodiments, selection of the "context objects" type (or selecting "auto-generate" or "select" as shown in FIG. 4H) causes a listing of context objects to be displayed, and the listing includes all types of content objects, e.g., images, locations, videos, contacts, news, postings, messages, etc. that are associated with the objects that are currently included in the first content group. After the user selects another object type from the listing of object types, the user device receives user selection of the additional object type for context objects from the listing of object types.

In accordance with some embodiments, the context objects can be automatically generated by the user device as described below. In accordance with some embodiments, in response to receiving the selection of the first plurality of images for inclusion in the first content group, the user device automatically generates the listing of context objects that are associated with at least one of the first plurality of images based on respective metadata associated with the at least one image and the one or more content objects of the at least one non-image object type. In some embodiments, the respective metadata includes one or more of associated time, associated location, associated people, and associated content subject matter. In some embodiments, the user device automatically collects and detects context information of the images, such as metadata, source, time and location being taken, people in the images, text context (e.g., accompanying emails). The user device then uses the context information to generate content objects that may or may not include images.

The process of automatic generating the listing of context objects may take the user device to detect and analyze context information. For example, in accordance with some embodiments, automatically generating the listing of context objects comprises: determining one or more geographic locations associated with the at least one of the first plurality of images; and including respective location objects for the one or more geographic locations in the listing of context objects that is associated with the at least one of the first plurality of images. In some embodiments, the respective location object for each of the one or more geographic locations includes at least a location marker on a map corresponding to the geographic location. For example, the user device automatically records a current location when the user device is being used to take a picture. Later on, when a user includes the image in the content group, a location object is provided to the user in the listing. After the location object is included in the group, when a user selects the image from the group later, the user device presents an option to the user to view the location. When the user accepts, the location object is presented to the user.

For another example, in accordance with some embodiments, automatically generating the listing comprises: determining whether any of the first plurality of images was posted in a social network by a contact of a user associated with the user device. In accordance with a determination that the at least one of the first plurality of images was posted in the social network by a contact of the user, the user device includes, in the listing of context objects, one or more social network postings associated with the at least one image in the social network. In some embodiments, the one or more social network postings include an original posting of the at least one image by the contact, and one or more comments associated with the original posting. The same process can be applied to chat messages, emails, news articles, etc. For example, a user sees a photo from a colleague, showing a baby catching a toy, on a social network website. Below the photo are some remarks: "Cute! How old is she?" "200 days." The user then selects the photo as one of the first plurality of images. The user device prompts to ask whether the user wants to save the name of the person posting the photo, the time of posting, and the remarks into the content group as well. The user may select a specific remark, e.g., "200 days," and put it into the content group.

For yet another example, in accordance with some embodiments, automatically generating the listing comprises: identifying one or more non-image media content items created by the user device within a predetermined time window around a creation time associated with the at least one of the first plurality of images; and including the identified one or more non-image media content items in the listing of context objects. For example, a user attended a party and took photos. He may specify that all media content, including videos taken and music recorded, as associated with one of the photo and belonging to a group labeled as "Party on June 2."

In accordance with some embodiments, time, social network context and location information can be combined to form criteria of a content group. In some embodiments, when there are multiple images or documents being selected for the first group, the user device automatically identifies common characteristics for the multiple images and/or documents and uses these common characteristics as criteria for generating the listing of content objects. For example, if all photos and videos selected include one person, the user device automatically identifies locally stored photos and videos that are associated with that person. For another example, a user joins a picnic and posts the pictures and videos taken during the picnic to a particular social network platform from time to time. After creating a content group "picnic with dancing team," the user begins to put a few picnic pictures into the group. The user device automatically recognize the rest of pictures and videos uploaded during the time and location of the picnic and remarks directed to these photos and videos from the particular social network platform and present them in the listing of context objects. In some embodiments, the user can also set up criteria for generating the listing of context objects. Such criteria may include one or more of time, location, object type, theme, person, etc.

Figure 4G:
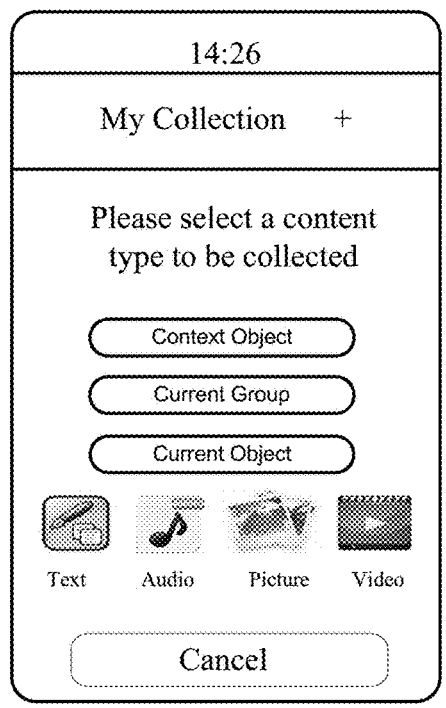
Figure 4H:
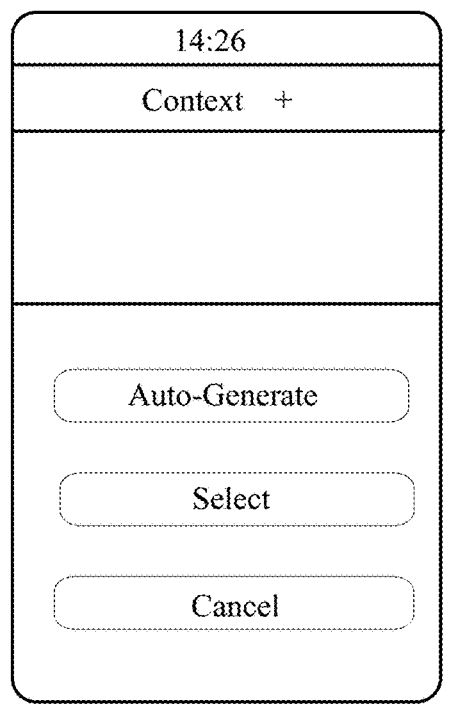
Figure 4I:
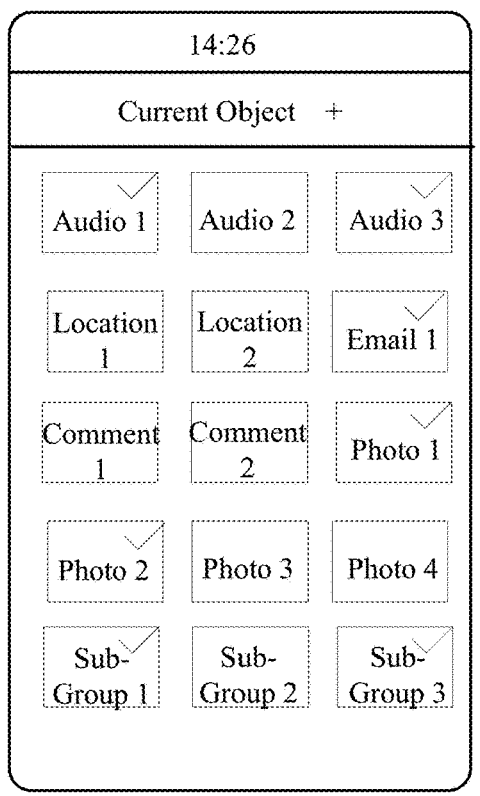

In accordance with some embodiments, the user device receives user selection of a second object type, which is "current object" type, from the listing of object types, as shown in FIG. 4G. If there is no input indicating completion of the first content group has been received after receiving the selection of the first plurality of images, the user device adds a second additional object type for current objects currently included in the first content group in the listing of object types, as shown in FIG. 4G. In some embodiments, the user device receives user selection of the second additional object type (current object) from the listing of object types and provides a listing of the current objects currently included in the first content group for user selection to move into a sub-group within the first content group, as shown in FIG. 4I. For example, the first content group in formation has included some downloaded images, when the user selects "current object," the user device presents these downloaded images. The user selects a few images and the user device moves them into the sub-group. Sometimes, a group has multiple sub-groups. The user device provides a listing of these sub-groups for the user to choose which sub-group will include additional objects.

Figure 4J:
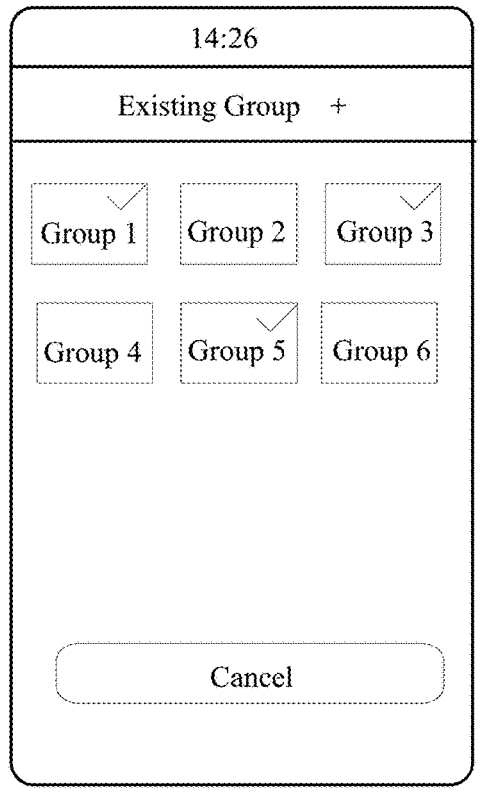

In accordance with some embodiments, the listing of object types includes a third object type for existing content groups, which is "existing group" type, as shown in FIG. 4G. When the user selects the third object type for existing content groups from the listing of object types, the user device provides a listing of existing content groups for user selection to include into the first content group, as shown in FIG. 4J. In response to receiving a selection of one or more existing content groups from the listing of existing content groups, moving the selected one or more existing content groups into the first content group as respective sub-groups of the first content group. Selection of the "existing group" type causes a listing of content groups to be displayed, and the listing includes all existing content groups that the user has previously created. Selection of one or more existing content groups while the creation of the first content group has not been completed means that the selected existing content groups will be moved into the first content groups as sub-groups. Alternatively, the objects contained in the selected content groups will be added to the first content group without creating a sub-group. For example, a user intends to create a content group "family together." Before completing the content group, the user selects a object type "existing group," and selects content groups with titles of "Susie's birthday party," "Miami beach," and "old house." These three content groups are then moved into the "family together" group as its sub-groups.

In accordance with some embodiments, in a step S304, the user device receives a selection of one or more content objects from the listing of context objects that are associated with at least one of the first plurality of images.

In accordance with some embodiments, in the process of forming the first content group containing the first plurality of images and the one or more context objects, the user device stores documents of images and the one or more context objects in accordance with the respective type of the documents. In some embodiments, storage locations are determined by the respective types of the documents. After documents are stored, the user device obtains the respective storage locations of the images and the one or more context objects, and associates the respective storage locations of the first plurality of images and the one or more context objects with the first content group. For example, images, audio, text and video are all stored separately from each other. The first group contains their storage location, sometimes URLs as discussed in FIGS. 1 and 2. When a user wants to view the first group, the phone obtains these documents based on the storage locations. In some other embodiments, all images and context objects are stored together in one location.

In some embodiments, the user is able to view the objects in a content group together. For example, the user device receives a user instruction of viewing the first content group, obtains the storage locations associated with the first content group, and retrieves the first plurality of images and the one or more context objects from the storage locations for displaying to the user. In some embodiments, the user is viewing or playing a document and wants to view the content of other content objects in the content group. At this time, the user selects the documents and asks the user device to show one or more content groups the document belongs to, and selects the content group the user wants to watch. For example, a user is playing a video at a high school graduation ceremony, and suddenly wants to see the email from mother congratulating for his graduation. He right-clicks the video, and is shown that the video belonging to three groups, "school year," "days in hometown," and "family correspondence." The user then selects family correspondence and asks the user device to search emails within certain date range that is close to graduation.

In accordance with some embodiments, in a step S305, after receiving the selection of the one or more content objects from the listing of context objects, the user device receives a user input indicating completion of the first content group.

For example, the user device may have a "complete" or "finish" button as illustrated in FIG. 4C. The user has the choice of going back and selecting a different group type, or completing now. If the user chooses to complete now, the group formation is completed, if the user choose to go back, the user can select another object type to add, as discussed in steps S303 and S304. A group is not completely formed until the completion input is received. The input indicating completion may be selection of the complete button, or some other predetermined gesture, etc.

In accordance with some embodiments, in a step S306, in response to receiving the user input indicating completion of the first content group, the user device forms the first content group containing the first plurality of images and the one or more content object selected from the listing of context objects information.

In accordance with some embodiments, after completion of the first content group, the user device displays a group icon for the first content group. The process of creating the group icon is illustrated in FIGS. 4D and 4E, and accompanying text in accordance with some embodiments. In some embodiments, in response to a selection of the group icon for the first content group, the user device displays a listing of objects included in the first content group and the affordance for forming a content group and the selection of the affordance from within the first content group initiates a process for forming a sub-group within the first content group. For example, when the user drags and selects a few documents, the user device asks whether the user wants to form a sub-group. When confirmed, the user device selects these documents selected by the user and begins to create a sub-group through a group-formation process described above.

Sometimes, a user wants to share a content group to one or more friends and contacts. In accordance with some embodiments, the user device receives a user instruction of sharing the first content group to a first plurality of contacts in a social network; and shares all content of the first content group, including the first plurality of images and the one or more context objects to the first plurality of the contacts in the social network. The same user instruction and sharing process applies to a sub-group of the first group. Therefore, the user does not have to select any particular documents to share with other people.

A user can use various ways to find objects in a content group. In accordance with some embodiments, the user device receives a search input that is associated with a first image in the first content group; and displays a search result including the first image and the first content group.

Sometimes, some images or context objects have not been locally stored when being assigned to a group. For example, a first image of the first plurality of images has not been fully downloaded to the user device when the first content group is formed. In some embodiments, the user device stores a download location of the first image; and downloads the first image at a predetermined time or under a predetermined circumstance after the formation of the first content group is completed. For example, a predetermined circumstance may relate to network quality, the photo is downloaded when the network quality is good.

In some embodiments, after storing the first plurality of images and the one or more context objects into the first content group, the user device continues to monitor a source of at least one of the first plurality of images for a predetermined period of time. If additional context objects that are associated with the at least one of the first plurality of images are generated after the formation of the first content group, the user device obtains and stores the respective additional context objects for user review. For example, a user stores comments to a photo as well as the photo in his phone. His phone continues to obtain the remarks to this photo made within one week after storing the photo.

Figure 5:
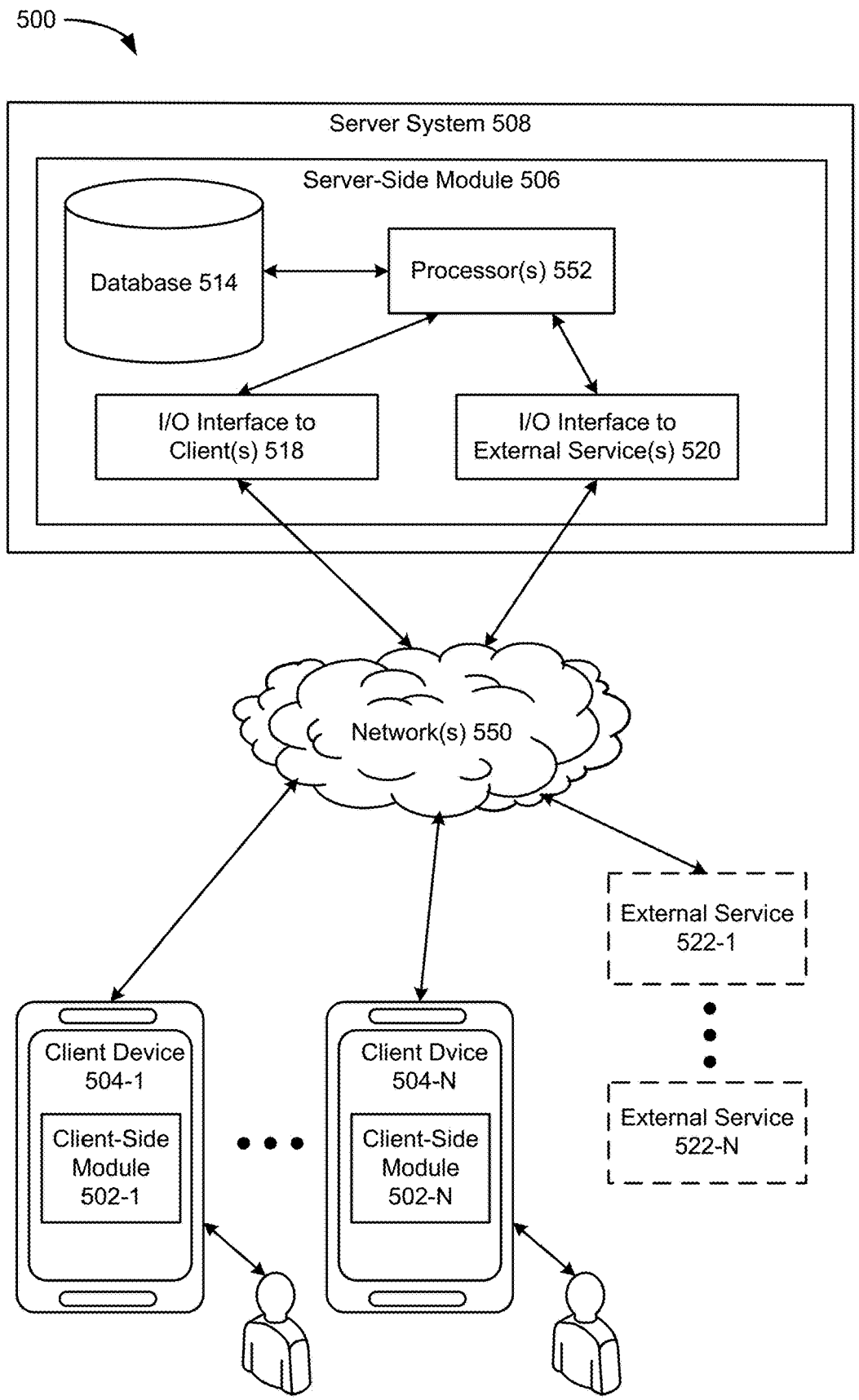
FIG. 5 is a block diagram of a server-client environment in accordance with some embodiments.

As shown in FIG. 5, content collection is implemented in a server-client environment 500 in accordance with some embodiments. In some embodiments, server-client environment 500 includes client-side processing 502-1 . . . 502-N (hereinafter "client-side module 502") executed on a client device 504-1 . . . 504-N, and server-side processing 506 (hereinafter "server-side module 506") executed on a server system 508. Client-side module 502 communicates with server-side module 506 through one or more networks 510. Client-side module 502 provides client-side functionalities for the social networking platform (e.g., instant messaging, and social networking services) and communications with server-side module 506. Server-side module 506 provides server-side functionalities for the social networking platform (e.g., instant messaging, and social networking services) for any number of client modules 502 each residing on a respective client device 504.

In some embodiments, server-side module 506 includes one or more processors 512, one or more databases 514, an I/O interface to one or more clients 518, and an I/O interface to one or more external services 520. I/O interface to one or more clients 518 facilitates the processing of input and output associated with the client devices for server-side module 506. One or more processors 512 obtain instant messages from a plurality of users, process the instant messages, process location information of a client device, and share location information of the client device to client-side modules 502 of one or more client devices. The database 514 stores various information, including but not limited to, map information, service categories, service provider names, and the corresponding locations. The database 514 may also store a plurality of record entries relevant to the users associated with location sharing, and the instant messages exchanged among the users for location sharing. I/O interface to one or more external services 520 facilitates communications with one or more external services 522 (e.g., merchant websites, credit card companies, and/or other processing services).

Examples of client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 510 include local area networks (LAN) and wide area networks (WAN) such as the Internet. One or more networks 510 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 508 is implemented on one or more stand-alone data processing apparatuses or a distributed network of computers. In some embodiments, server system 508 also employs various virtual devices and/or services of third party service providers (e.g., third-party cloud service providers) to provide the underlying computing resources and/or infrastructure resources of server system 508.

Server-client environment 500 shown in FIG. 5 includes both a client-side portion (e.g., client-side module 502) and a server-side portion (e.g., server-side module 506). In some embodiments, data processing is implemented as a stand-alone application installed on client device 504. In addition, the division of functionalities between the client and server portions of client environment data processing can vary in different embodiments. For example, in some embodiments, client-side module 502 is a thin-client that provides only user-facing input and output processing functions, and delegates all other data processing functionalities to a backend server (e.g., server system 508).

Figure 6:
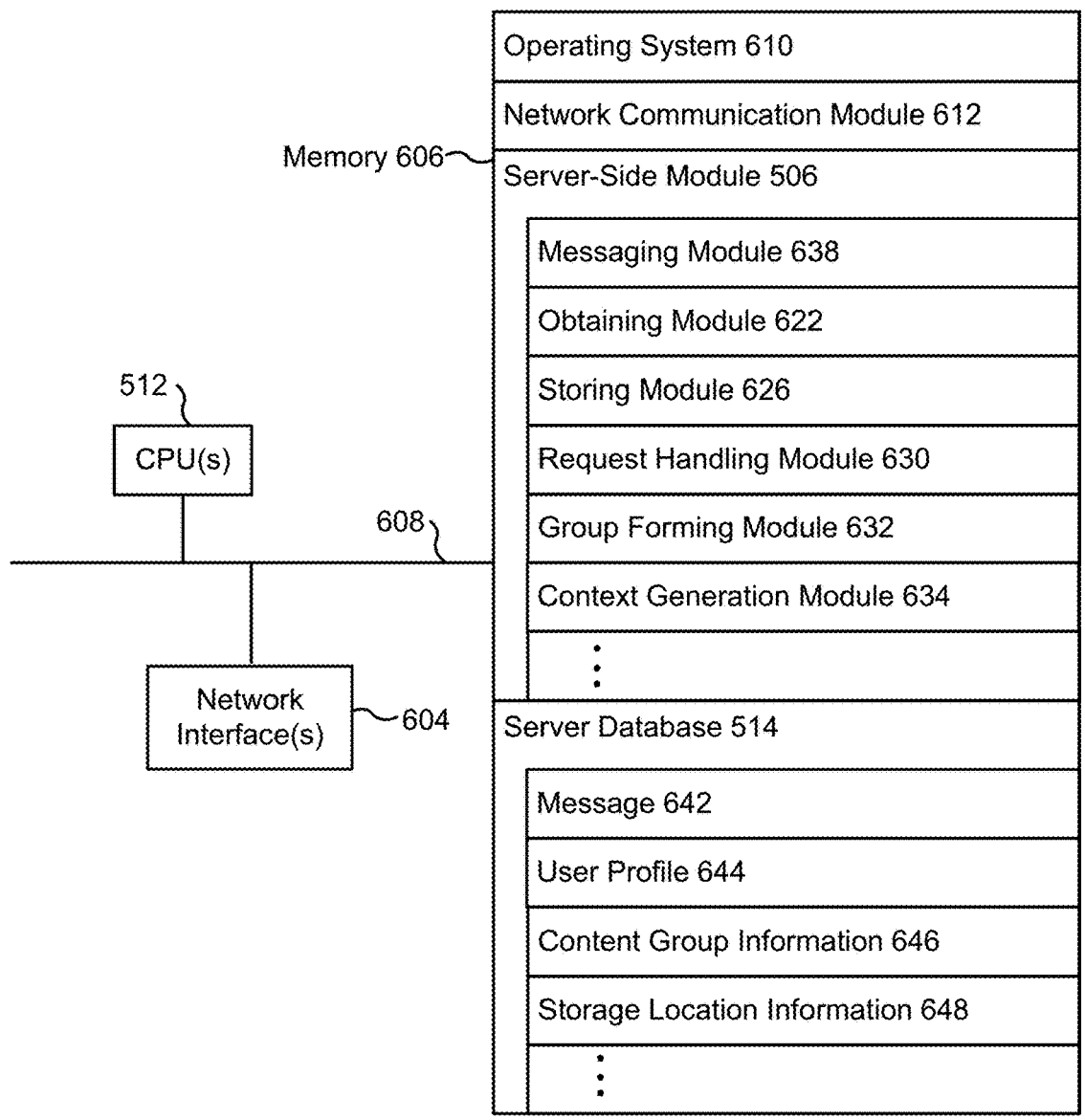
FIG. 6 is a block diagram of a server system in accordance with some embodiments.

FIG. 6 is a block diagram illustrating a server system 508 in accordance with some embodiments. Server system 508, typically, includes one or more processing units (CPUs) 512, one or more network interfaces 604 (e.g., including I/O interface to one or more clients 518 and I/O interface to one or more external services 520), memory 606, and one or more communication buses 608 for interconnecting these components (sometimes called a chipset).

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, optionally, includes one or more storage devices remotely located from one or more processing units 512. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- operating system 610 including procedures for handling various basic system services and for performing hardware dependent tasks;
- network communication module 612 for connecting server system 508 to other computing devices (e.g., client devices 504 and external service(s) 522) connected to one or more networks 510 via one or more network interfaces 604 (wired or wireless);
- server-side module 506, which provides server-side data processing for the social networking platform (e.g., content colleting and sharing, instant messaging, and social networking services), includes, but is not limited to:
  - messaging module 638 for processing and routing instant messages exchanged among a first user and one or more second users of a social networking platform;
  - obtaining module 622 for obtaining location information of the first user from a client device 104 associated with the first user;
  - storing module 626 for storing various information in the database 514, the various information including user IDs, content groups and objects;
  - request handling module 630 for handling and responding to various requests sent from client devices of the social networking platform;
  - group forming module 632 for obtaining group forming instructions and inputs from client devices 504; and
  - context generation module 634 for automatically generating the listing of context objects that are associated with images or other content objects; and
- one or more server database 514 storing data for the social networking platform, including but not limited to:
  - messages 642 storing messages exchanged among a plurality of users associated with location sharing;
  - user profiles 644 storing user profiles for the plurality of users associated with location sharing, wherein a respective user profile for a user may include a user/account name or handle, login credentials to the social networking platform, location information of the user (e.g., previous location information), payment data (e.g., linked credit card information, app credit or gift card balance, billing address, shipping address, etc.), custom parameters (e.g., age, location, hobbies, etc.) for the user, social network contacts, groups of contacts to which the user belongs, and identified trends and/or likes/dislikes of the user;
  - content group information 646 storing content group information, including content object information; and
  - storage location information 648 storing storage location information of content objects in content groups.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
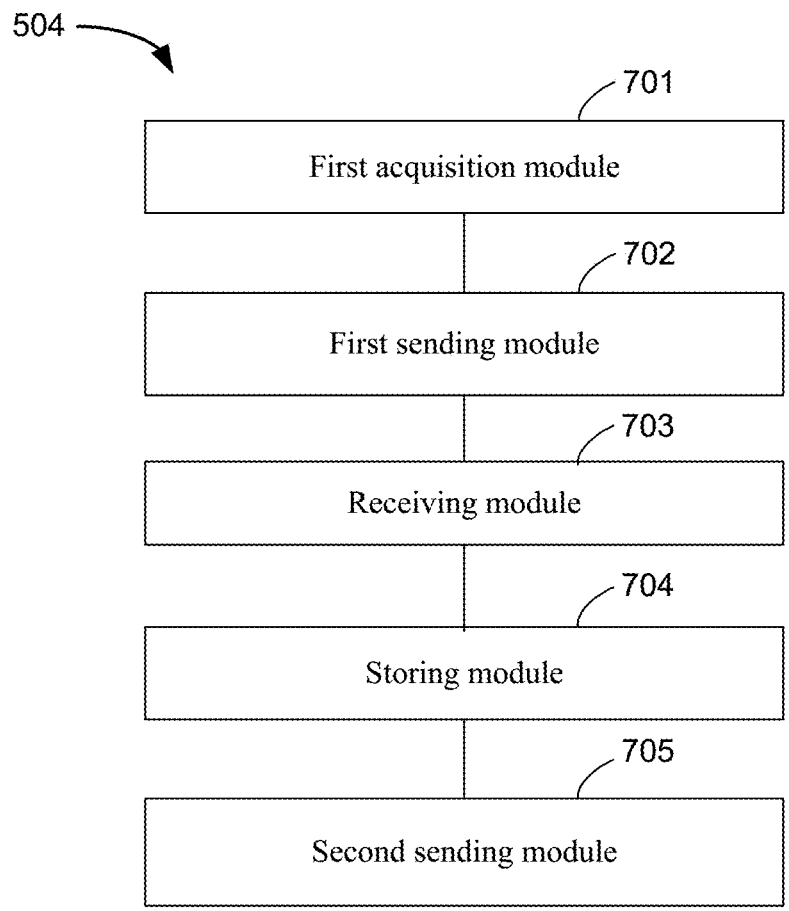
FIG. 7 is a block diagram of a client device in accordance with some embodiments.

FIG. 7 is a structure block diagram of an apparatus for collecting contents in accordance with some embodiments, comprising: a first acquisition module 701, configured for acquiring a plurality of content objects to be collected which are selected by the user; a first sending module 702, configured for sending the plurality of content objects to a server; a receiving module 703, configured for receiving the URL of each content object of the plurality of content objects sent by the server; a storing module 704, configured for creating a data storage structure, storing the ID and URL of each content object in the data storage structure, taking the data storage structure as a collecting item and adding the data storage structure into a collection item list; and a second sending module 705, configured for sending the user ID and the collection item to the server.

Further, in accordance with some embodiments, the apparatus comprises a generating module, configured for acquiring a local storage path of each content object in the terminal, and respectively generating an ID for each content object.

Further, in accordance with some embodiments, the apparatus comprises a stacking module, configured for snapping a part from a picture, stacking the part on a preset icon, and storing the preset icon in the data storage structure.

Further, in accordance with some embodiments, the apparatus comprises a second acquisition module, configured for acquiring a collection item to be viewed, and creating a picture details page.

The second acquisition module comprises: an acquisition unit, configured for acquiring the collection item to be viewed, and acquiring each picture included in the collection item; a shrinking unit, configured for shrinking each picture to obtain a thumbnail of each picture; and an addition unit, configured for creating a blank page, and adding the thumbnail of each picture into the blank page to obtain the picture details page.

Further, the apparatus further comprises a display module, configured for acquiring the thumbnail of one picture selected by the user, amplifying the thumbnail of the picture so as to restore the original size of the picture, and displaying the amplified picture.

Figure 8:
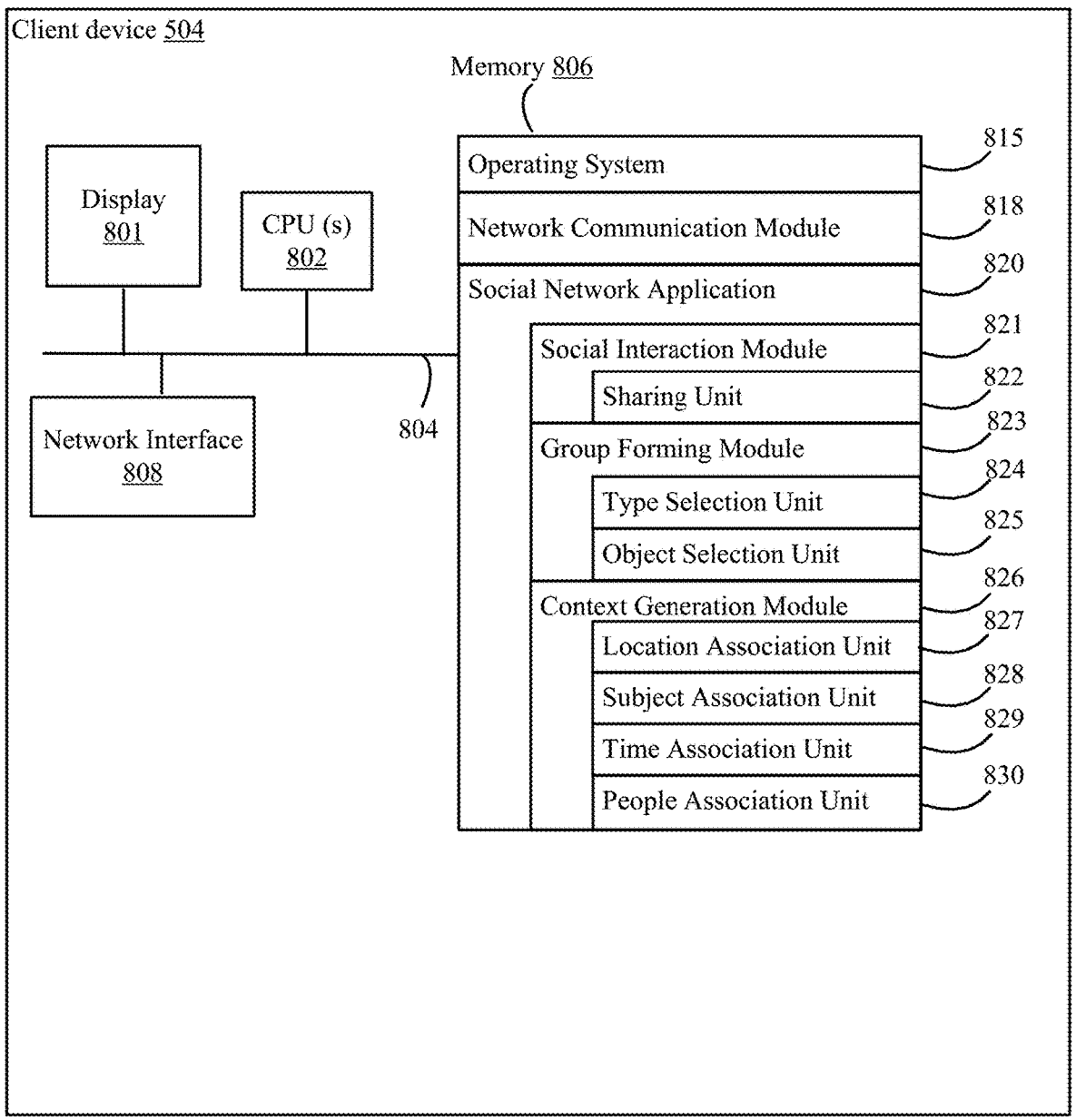
FIG. 8 is a block diagram of a client device in accordance with some embodiments.

FIG. 8 is a diagram of an example implementation of a user device 800 in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the user device 800 includes one or more processing units (CPU's) 802, one or more network or other communications interfaces 808, a display 801, memory 806, and one or more communication buses 804 for interconnecting these and various other components. The communication buses may include circuitry (sometimes called a chipset) that interconnects and controls communications between system components. The memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 806 may optionally include one or more storage devices remotely located from the CPU(s) 802. The memory 806, including the non-volatile and volatile memory device(s) within the memory 806, comprises a non-transitory computer readable storage medium.

In some implementations, the memory 806 or the non-transitory computer readable storage medium of the memory 806 stores the following programs, modules and data structures, or a subset thereof including an operating system 816, a network communication module 818, and a social network application 820.

In accordance with some embodiments, the operating system 816 includes procedures for handling various basic system services and for performing hardware dependent tasks.

In accordance with some embodiments, the network communication module 818 facilitates communication with other devices via the one or more communication network interfaces 808 (wired or wireless) and one or more communication networks, such as the internet, other wide area networks, local area networks, metropolitan area networks, and so on.

In accordance with some embodiments, the social network application 820 provides content group functions in addition to regular social network functions. In accordance with some embodiments, the social network application 820 comprises a social interaction module 821, a group forming module 823, and a context generation module 826.

In accordance with some embodiments, the social interaction module 821 provides social network interaction functions. In some embodiments, the social interaction module 821 comprises a sharing unit 822, which is configured for sharing and receiving content groups as well as documents.

In accordance with some embodiments, the group forming module 823 is configured to provide user interfaces for content group forming, receive user selections of content objects, receive user inputs and instructions for group forming and create content groups. In some embodiments, the group forming module 823 comprises a type selection unit, configured to receive user inputs of object types and an object selection unit, configured to receive user inputs of objects and store the selected objects or their storage locations.

In accordance with some embodiments, the context generation module 826 is configured to providing a listing of context objects that fit with users' criteria for a group in formation or are consistent with objects within the group in formation. The context generation module 826 is further configured to automatically generate the listing of context objects that are associated with at least one of the first plurality of images. In some embodiments, the context generation module 826 comprises a location association unit 827, a subject association unit 828, a time association unit 829, and a people association unit 830, which are configured to identify and provide documents that are associated with the content group in formation based on location, time, subject matter and people, respectively.

The foregoing descriptions are merely preferred embodiments of the present application, but are not intended to limit the present application. Any modification, equivalent replacement and improvement figured out within the spirits and principles of the present application shall all fall within the protection scope of the present application.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the application to the precise forms disclosed. Many modifications and variations are possible in view of the above teachings. The implementations were chosen and described in order to best explain principles of the technology and its practical applications, to thereby enable others skilled in the art to best utilize the technology and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of storing content objects within a social network application, comprising:
   at a mobile device having one or more processors and memory for storing one or more programs to be executed by the one or more processors:
      providing a user interface of the social network application on the mobile device;
      presenting for user selection a first group of images for inclusion in first content group;
      receiving a first user selection of a plurality of images from the group of images for inclusion in the first content group;
      in response to the first user selection of the plurality of images:
         detecting and analyzing context information of the first plurality of user-chosen images;
         automatically generating and presenting for user selection a listing of a plurality of context objects associated with the first plurality of user-chosen images for inclusion in the first content group, wherein each element of the listing of context objects is generated based on the analyzing of metadata of the images in the plurality of user-chosen images and the listing of context objects includes one or more content objects of a communication object type representing communications and interactions of another user of the social network with an image of the plurality of user-chosen images on the social network, wherein the listing includes at least one additional context object type of a non-image type;
      receiving a second user selection of one or more content objects from the listing of context objects that are associated with at least one of the first plurality of user-chosen images;
      in response to the second user selection of the one or more content objects from the listing of context objects:
         forming the first content group containing the first plurality of user-chosen images and the one or more content object selected from the listing of context objects information; and
         in response to user selection of an element from the first content group; presenting for user selection a plurality of user-created content groups to which the element belongs, the plurality of user-created content groups including the first content group.

2. The method of claim 1, further comprising:
   in response to receiving the selection of the first plurality of user-chosen images for inclusion in the first content group, automatically generating the listing of context objects that are associated with at least one of the first plurality of user-chosen images based on respective metadata associated with the at least one image and one or more content objects of at least one non-image object type, wherein the respective metadata includes one or more of associated time, associated location, associated people, and associated content subject matter.

3. The method of claim 2, wherein automatically generating the listing of context objects that are associated with the at least one of the first plurality of user-chosen images further comprises:
   determining one or more geographic locations associated with the at least one of the first plurality of user-chosen images; and
   including respective location objects for the one or more geographic locations in the listing of context objects that is associated with the at least one of the first plurality of user-chosen images, wherein the respective location object for each of the one or more geographic locations includes at least a location marker on a map corresponding to the geographic location.

4. The method of claim 1, further comprising:
   in response to receiving user selection of an affordance, presenting a listing of object types for user selection;
   receiving user selection of a first object type from the listing of object types, the first object type being images;
   in response to receiving the user selection of the first object type, providing the first group of images;
   in response to a determination that no input indicating completion of the first content group has been received after receiving the selection of the first plurality of images:
      adding a first additional object type for context objects in the listing of object types; and
      re-presenting the listing of object types for user selection;
   receiving user selection of the first additional object type for context objects from the listing of object types; and
   in response to the user selection of the first additional object type, adding an additional set of context objects corresponding to the first additional object type to the first plurality of images.

5. The method of claim 4, further comprising:
   in response to the determination that no input indicating completion of the first content group has been received after receiving the selection of the first plurality of user-chosen images, adding a second additional object type for current objects currently included in the first content group in the listing of object types before re-presenting the listing of object types.

6. The method of claim 4, wherein the listing of object types includes a third object type for existing content groups, and wherein the method further comprises:
   before receiving the user input indicating completion of the first content group, receiving a user input selecting the third object type for existing content groups from the listing of object types;
   in response to receiving the user input selecting the third object type for existing content groups, providing a listing of existing content groups for user selection to include into the first content group; and
   in response to receiving a selection of one or more existing content groups from the listing of existing content groups, moving the selected one or more existing content groups into the first content group as respective sub-groups of the first content group.

7. The method of claim 1, further comprising:
   after completion of the first content group, displaying a group icon for the first content group; and
   in response to a selection of the group icon for the first content group, displaying a listing of objects included in the first content group and an affordance for forming a content group, wherein selection of the affordance from within the first content group initiates a process for forming a sub-group within the first content group.

8. A mobile device of storing content objects within a social network application, comprising:

one or more processors;

memory coupled to the one or more processors; and one or more programs stored in the memory that, when executed by the one or more processors, cause the mobile device to perform a plurality of operations including:

providing a user interface of the social network application on the mobile device;

presenting for user selection a first group of images for inclusion in a first content group;

receiving a first user selection of a plurality of images from the group of images for inclusion in the first content group;

in response to the first user selection of the plurality of images:

detecting and analyzing context information of the first plurality of user-chosen images;

automatically generating and presenting for user selection a listing of a plurality of context objects associated with the first plurality of user-chosen images for inclusion in the first content group, wherein each element of the listing of context objects is generated based on the analyzing of metadata of the images in the plurality of user-chosen images and the listing of context objects includes one or more content objects of a communication object type representing communications and interactions of another user of the social network with an image of the plurality of user-chosen images on the social network, wherein the listing includes at least one additional context object type of a non-image type;

receiving a second user selection of one or more content objects from the listing of context objects that are associated with at least one of the first plurality of user-chosen images;

in response to the second user selection of the one or more content objects from the listing of context objects:

forming the first content group containing the first plurality of user-chosen images and the one or more content object selected from the listing of context objects information; and in response to user selection of an element from the first content group; presenting for user selection a plurality of user-created content groups to which the element belongs, the plurality of user-created content groups including the first content group.

9. The mobile device of claim 8, wherein the plurality of operations further include:

in response to receiving the selection of the first plurality of user-chosen images for inclusion in the first content group, automatically generating the listing of context objects that are associated with at least one of the first plurality of user-chosen images based on respective metadata associated with the at least one image and the one or more content objects of the at least one non-image object type, wherein the respective metadata includes one or more of associated time, associated location, associated people, and associated content subject matter.

10. The mobile device of claim 9, wherein the operation of automatically generating the listing of context objects that are associated with the at least one of the first plurality of user-chosen images further comprises:

determining one or more geographic locations associated with the at least one of the first plurality of user-chosen images; and including respective location objects for the one or more geographic locations in the listing of context objects that is associated with the at least one of the first plurality of user-chosen images, wherein the respective location object for each of the one or more geographic locations includes at least a location marker on a map corresponding to the geographic location.

11. The mobile device of claim 8, wherein the plurality of operations further include:

in response to receiving user selection of an affordance, presenting a listing of object types for user selection;

receiving user selection of a first object type from the listing of object types, the first object type being images;

in response to receiving the user selection of the first object type, providing the first group of images;

in response to a determination that no input indicating completion of the first content group has been received after receiving the selection of the first plurality of images:

adding a first additional object type for context objects in the listing of object types; and re-presenting the listing of object types for user selection; and receiving user selection of the first additional object type for context objects from the listing of object types; and in response to the user selection of the first additional object type, adding an additional set of context objects corresponding to the first additional object type to the first plurality of images.

12. The mobile device of claim 11, wherein the plurality of operations further include:

in response to the determination that no input indicating completion of the first content group has been received after receiving the selection of the first plurality of user-chosen images, adding a second additional object type for current objects currently included in the first content group in the listing of object types before re-presenting the listing of object types.

13. The mobile device of claim 11, wherein the listing of object types includes a third object type for existing content groups, and the plurality of operations further include:

before receiving the user input indicating completion of the first content group, receiving a user input selecting the third object type for existing content groups from the listing of object types;

in response to receiving the user input selecting the third object type for existing content groups, providing a listing of existing content groups for user selection to include into the first content group; and in response to receiving a selection of one or more existing content groups from the listing of existing content groups, moving the selected one or more existing content groups into the first content group as respective sub-groups of the first content group.

14. The mobile device of claim 8, wherein the plurality of operations further include:

after completion of the first content group, displaying a group icon for the first content group; and in response to a selection of the group icon for the first content group, displaying a listing of objects included in the first content group and an affordance for forming a content group, wherein selection of the affordance from within the first content group initiates a process for forming a sub-group within the first content group.

15. A non-transitory computer readable storage medium storing a plurality of machine readable instructions in connection with a mobile device having one or more processors, wherein the plurality of machine readable instructions, when executed by the one or more processors, cause the mobile device to perform a plurality of operations including:
providing a user interface of the social network application on the mobile device;
presenting for user selection a first group of images for inclusion in a first content group;
receiving a first user selection of a plurality of images from the group of images for inclusion in the first content group;
in response to the first user selection of the plurality of images:
detecting and analyzing context information of the first plurality of user-chosen images;
automatically generating and presenting for user selection a listing of a plurality of context objects associated with the first plurality of user-chosen images for inclusion in the first content group, wherein each element of the listing of context objects is generated based on the analyzing of metadata of the images in the plurality of user-chosen images and the listing of context objects includes one or more content objects of a communication object type representing communications and interactions of another user of the social network with an image of the plurality of user-chosen images on the social network, wherein the listing includes at least one additional context object type of a non-image type;
receiving a second user selection of one or more content objects from the listing of context objects that are associated with at least one of the first plurality of user-chosen images;
in response to the second user selection of the one or more content objects from the listing of context objects:
forming the first content group containing the first plurality of user-chosen images and the one or more content object selected from the listing of context objects information; and
in response to user selection of an element from the first content group; presenting for user selection a plurality of user-created content groups to which the element belongs, the plurality of user-created content groups including the first content group.

16. The non-transitory computer readable storage medium of claim 15, wherein the plurality of operations further include:
in response to receiving the selection of the first plurality of user-chosen images for inclusion in the first content group, automatically generating the listing of context objects that are associated with at least one of the first plurality of user-chosen images based on respective metadata associated with the at least one image and the one or more content objects of the at least one non-image object type, wherein the respective metadata includes one or more of associated time, associated location, associated people, and associated content subject matter.

17. The non-transitory computer readable storage medium of claim 16, wherein the operation of automatically generating the listing of context objects that are associated with the at least one of the first plurality of user-chosen images further comprises:
determining one or more geographic locations associated with the at least one of the first plurality of user-chosen images; and
including respective location objects for the one or more geographic locations in the listing of context objects that is associated with the at least one of the first plurality of user-chosen images, wherein the respective location object for each of the one or more geographic locations includes at least a location marker on a map corresponding to the geographic location.

18. The non-transitory computer readable storage medium of claim 15, wherein the plurality of operations further include:
in response to receiving user selection of an affordance, presenting a listing of object types for user selection;
receiving user selection of a first object type from the listing of object types, the first object type being images;
in response to receiving the user selection of the first object type, providing the first group of images;
in response to a determination that no input indicating completion of the first content group has been received after receiving the selection of the first plurality of images:
adding a first additional object type for context objects in the listing of object types; and
re-presenting the listing of object types for user selection; and
receiving user selection of the first additional object type for context objects from the listing of object types; and
in response to the user selection of the first additional object type, adding an additional set of context objects corresponding to the first additional object type to the first plurality of images.

19. The non-transitory computer readable storage medium of claim 18, wherein the listing of object types includes a third object type for existing content groups, and the plurality of operations further include:
before receiving the user input indicating completion of the first content group, receiving a user input selecting the third object type for existing content groups from the listing of object types;
in response to receiving the user input selecting the third object type for existing content groups, providing a listing of existing content groups for user selection to include into the first content group; and
in response to receiving a selection of one or more existing content groups from the listing of existing content groups, moving the selected one or more existing content groups into the first content group as respective sub-groups of the first content group.

20. The non-transitory computer readable storage medium of claim 15, wherein the plurality of operations further include:
after completion of the first content group, displaying a group icon for the first content group; and
in response to a selection of the group icon for the first content group, displaying a listing of objects included in the first content group and an affordance for forming a content group, wherein selection of the affordance from within the first content group initiates a process for forming a sub-group within the first content group.

* * * * *